United States Patent [19]

Horikawa

[11] Patent Number: 4,631,669
[45] Date of Patent: Dec. 23, 1986

[54] DATA PROCESSING SYSTEM HAVING NO BUS UTILIZATION PRIORITY CONTROL

[75] Inventor: Akinori Horikawa, Tokyo, Japan
[73] Assignee: NEC Corporation, Tokyo, Japan
[21] Appl. No.: 597,964
[22] Filed: Apr. 9, 1984
[30] Foreign Application Priority Data
  Apr. 7, 1983 [JP] Japan .................. 58-61148
[51] Int. Cl.⁴ .................................. G06F 13/36
[52] U.S. Cl. .................................. 364/200
[58] Field of Search ... 364/200 MS File, 900 MS File
[56] References Cited
U.S. PATENT DOCUMENTS
4,003,033 1/1977 O'Keefe et al. ............ 364/200
4,059,851 11/1977 Nutter et al. ............... 364/200
4,179,737 12/1979 Kim ........................... 364/200
4,298,933 11/1981 Shimokawa ................ 364/200
4,365,294 12/1982 Stokken ..................... 364/200
4,453,214 6/1984 Adcock ...................... 364/200

Primary Examiner—David Y. Eng
Attorney, Agent, or Firm—Sughrue, Mion, Zinn, Macpeak & Seas

[57] ABSTRACT

In order to ensure that separately arranged instruction processing and execution units do not use the same bus and the same time, and to eliminate the need for a multiplexer, when the execution unit requires the use of the bus, a pause signal is fed to the instruction processing unit to temporarily disable a processing portion involved therein in case the both units use the same bus concurrently.

2 Claims, 3 Drawing Figures

DATA PROCESSING SYSTEM HAVING NO BUS UTILIZATION PRIORITY CONTROL

BACKGROUND OF THE INVENTION

1. Field of The Invention

The present invention relates to a data processing system, and more particularly to such a kind of system including separate units for processing and executing instructions. These units communicate with a bus and are arranged to operate synchronously in accordance with microprogrammed control.

2. Description of the Prior Art

In order to increase the speed of processing and executing instructions, it is known in the art to provide separate instruction processing and execution units which are operated under microprogrammed control. These separate units are operatively coupled via a bus in a manner to operate in synchronism with each other. The instruction processing unit is provided with a plurality of microinstruction routines, and successively fetches instructions from a main memory and interprets each instruction under the control of the corresponding sequence of microinstructions. The execution unit is also provided with a plurality of microinstruction routines, and, executes, with microprogrammed control, the instruction in accordance with the result(s) obtained at the instruction processing unit, and, at the same time, the instruction processing unit fetches and implements the next instruction.

During the concurrent, synchronous implementations of the separate units, various information or data paths are formed depending on the microinstructions. In order to prevent the separate units from using the same bus at the same time, a bus utilization control technique has been proposed. In this specification, by definition, such a technique is termed "bus utiization priority control". In accordance with the prior art bus utilization priority control, each unit desiring to use the bus sends a bus utilization request to a bus arbitration means and is allowed to access the bus only when receiving a permission or acknowledgement from the bus arbitration means. In the event that the bus arbitration means receives a request from more than two units at the same time, the means determines the priority of the bus utilization. If the above-mentioned bus utilization priority control is not provided, there is a possibility that the separate units use the same bus concurrently. For example, two registers of the execution unit may communicate data using the bus at the same time when the instruction processing unit employs the same bus. One known practice for overcoming the above problem is to provide an additional bus which serves to transfer the data between the two registers whereby the concurrent use of the same bus can be avoided. The provision of the additional bus requires multiplexers for selectively switching over the registers to one of the two buses, and hence increases the number of parts with the attendant disadvantage of hardware complexity, and increases design difficulties especially where available parts space is limited.

SUMMARY OF THE INVENTION

The object of the present invention is therefore to provide a data processing system which is free from the aforementioned problem inherent in the prior art.

The another object of the present invention is to provide a data processing system including separate units for processing and executing instructions with microprogrammed control in synchronism with each other, which data processing system is capable of eliminating concurrent use of a bus without increasing hardware complexity.

In brief the these objects are fullfilled by a data processing system wherein in order to ensure that separately arranged instruction processing and execution units do not use the same bus and the same time, and to eliminate the need for the above-mentioned bus utilization priority control, when the execution unit requires the use of the bus, a pause signal is fed to the instruction processing unit to temporarily disable a processing portion involved therein in case the both units use the same bus concurrently.

More specifically, the present invention takes a form of a data processing system having no bus utilization priority control, comprising: an instruction processing unit operating in accordance with the first microinstructions prestored therein: an execution unit which operates in accordance with second microinstructions prestored therein and which operates synchronously with said instruction processing unit; and a bus operatively connected with said instruction processing unit and said execution unit; said execution unit generating a pause command when said execution unit uses said bus during the next microinstruction cycle of said first microinstructions; said instruction processing unit being supplied with said pause command, and including a circuit which causes double occurrences of one of said second microinstructions in response to said pause command in the event that said instruction processing unit uses said bus during the next microinstruction cycle of said second microinstructions, said instruction processing unit further including an instruction processing portion which is arranged to temporarily disable the first microinstruction of said double occurrences in response to said pause command.

BRIEF DESCRIPTION OF THE DRAWINGS

The features and advantages of the present invention will become more clearly appreciated from the following description taken in conjunction with the accompanying drawings in which like blocks, circuits or circuit elements are denoted by like reference numerals and in which.

DETAILED DESCRIPTION OF THE PREFERRED EMBODIMENTS

Figure 1:
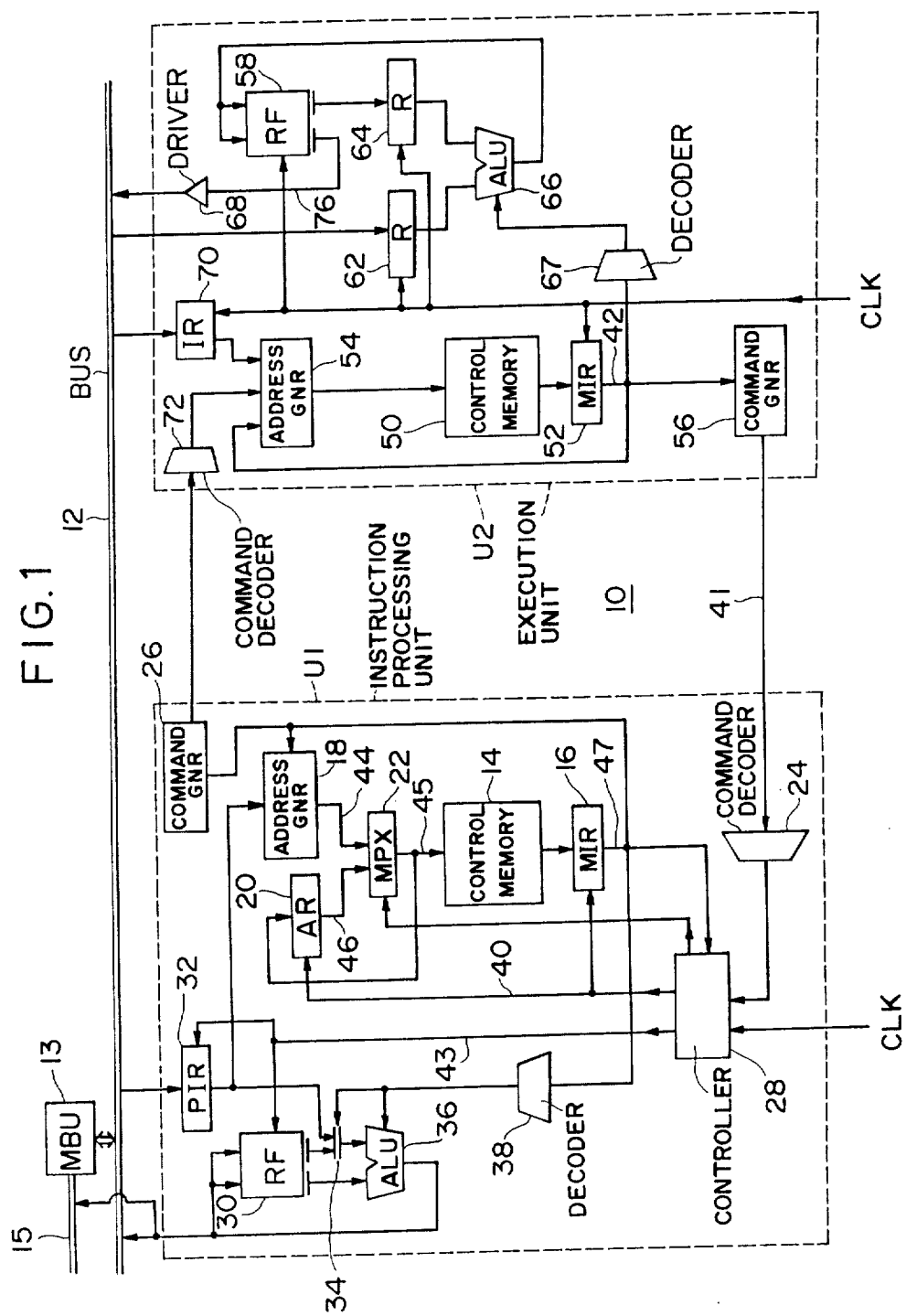
FIG. 1 is a block diagram showing one example of a data processing system according to the present invention.

Referring now to FIG. 1, there is shown in block diagram form an embodiment of a data processing system according to the present invention. It should be noted that portions not pertinent to the understanding of the present invention are omitted or simplified for the sake of clarity, and hence the FIG. 1 embodiment is of a considerably simplified configuration.

A data processing system 10 generally comprises an instruction processing unit U1 and an execution unit U2, both of which are separately provided and which are operatively coupled via a bus 12 for synchronous operation. The units U1 and U2 are controlled under microprograms. The unit U1 receives an instruction from a main memory (not shown) and processes same. Unit U2 executes the instruction according to the result(s) obtained at unit U1, while unit U1 processes the next instruction. Data fetch/store is implemented between the main memory and each unit over two microinstruction cycles. More specifically, during the first cycle, the unit transfers an address signal to the main memory, while during the second cycle, the main memory supplies the bus 12 with the data stored therein which is then transferred to the unit.

The instruction processing unit U1 comprises a control memory 14 in which a plurality of microinstruction routines are stored, a microinstruction register 16, a control memory address generator 18, an address register 20, two multiplexers 22 and 34, two command decoders 24 and 26, a controller 28 to which clocks (CLK) are fed from a clock generator (not shown) and to which the output of the command decoder 24 is applied, a register file 30, a prefetch instruction register 32 (including a plurality of registers although not shown), an arithmetic-and-logic unit (ALU) 36, and a microinstruction decoder 38, all of which are coupled as shown. A processing portion of the unit U1 is formed of the ALU 36, the register file 30 and the register 32 in this instance.

The execution unit U2 comprises a control memory 50 in which a plurality of microinstruction routines are stored, a microinstruction register 52, a control memory address generator 54, a command generator 56, a register file 58, two registers 62 and 64, an arithmetic-and-logic unit 66, a microinstruction decoder 67, a bus driver 68, an instruction register 70, and a command decoder 72, all of which are coupled as shown.

Figure 2:
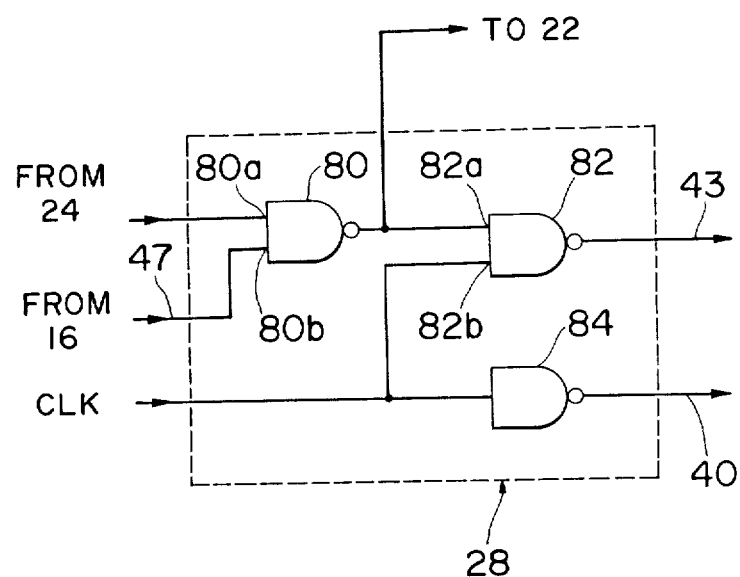
FIG. 2 is a block diagram showing one example of a controller shown in FIG. 1.

FIG. 2 is a logic block diagram showing one example of the controller 28 (FIG. 1), which includes in this instance three NAND gates 80, 82 and 84. The NAND gate 80 receives at the first input thereof 80a the output of the command decoder 24, and also receives at the second input thereof 80b the content of the microinstruction register 16 via a line 47. The command decoder 24 shown in FIG. 1 applies a high logic level to the first input 80a of the NAND gate 80 when receiving a pause command from the command generator 56 of the unit U2. Otherwise, the command decoder 24 continues to apply a low logic level to the first input 80a. On the other hand, the register 16 applies a high logic level to the NAND gate 80 if the unit U1 uses the bus 12 at the next microinstruction cycle. Otherwise, the register 47 applies a low logic level to the NAND gate 80. The NAND gate 80 has the output thereof connected to the multiplexer 22 and also to the input 82a of the NAND gate 82 which receives at the input thereof 82b the clock signals (CLK). The NAND gate 82 has the output thereof connected to a line 43. The NAND gate 84 receives the clock signals (CLK) which are inverted and outputted over a line 40. It is therefore understood that the NAND gate 80 outputs a low logic level during, when the pause command is applied to the unit U1 and at the same time when the register 16 includes the information that the unit U1 uses the bus 12 at the next microinstruction cycle. Consequently, as long as the NAND gate 80 outputs the low logic level, the NAND gate 82 generates a high logic level therefrom. The pause command is generated according to a microinstruction. A determination of whether or not to produce the pause command is made when programming the microinstructions.

The operation of the FIG. 1 embodiment will be discussed with reference to the block diagram of FIG. 2 and the time chart of FIG. 3.

Figure 3:
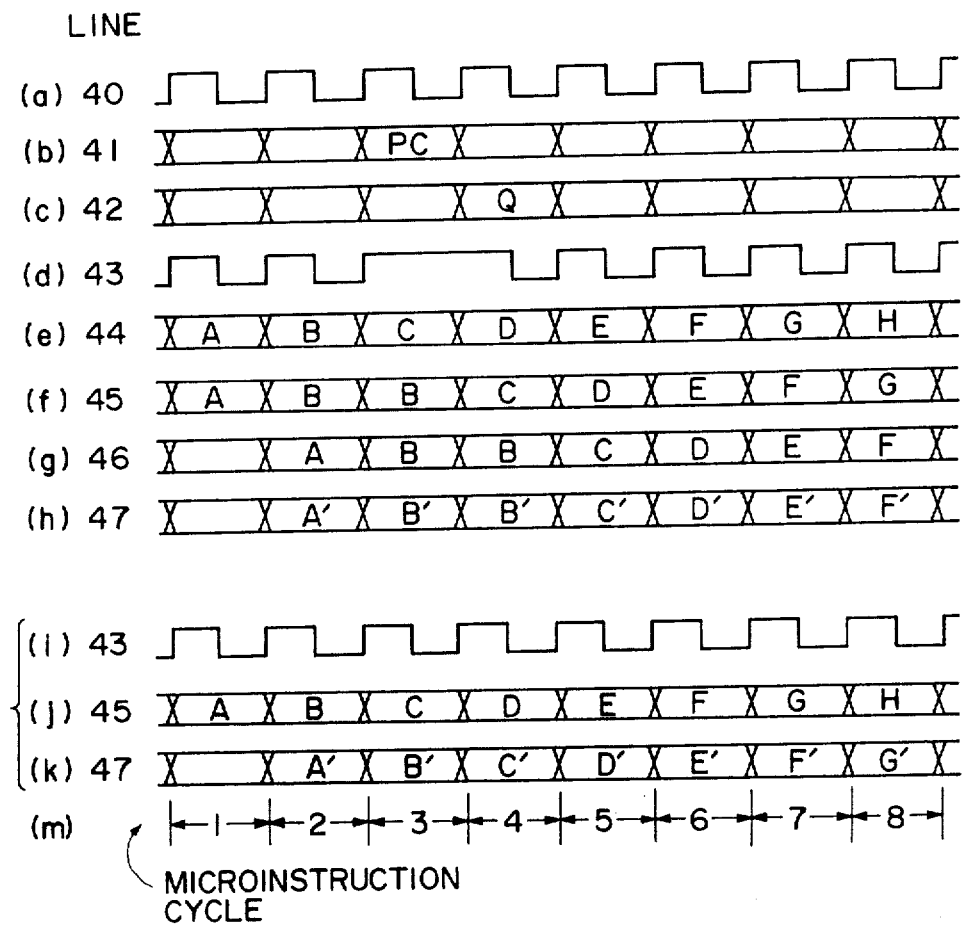
FIG. 3 is a time chart which demonstrates the timing which characterizes the embodiment shown in FIG. 1.

The instruction processing unit U1 fetches an instruction from the main memory (not shown) via the bus 12 in response to a leading edge of a clock (shown in FIG. 3(d) or FIG. 3(i)) supplied over a line 43 from the controller 28, and stores the same in the prefetch instruction register 32. The register 32 applies its content to the control memory address generator 18, which determines or interprets the kind of instruction and thence successively generates address signals for deriving the microinstruction routine (which corresponds to the kind of instruction) previously stored in the control memory 14. The address signals from the generator 18 appear over a line 44 and denoted A, B, C, D, . . . in FIG. 3(e). The multiplexer 22 normally selects the generator 18, so that the generator 18 applies the address signal to the control memory over a line 45. Each of FIGS. 3(f) and 3(j) shows the address signals A, B, C, D, . . . successively applied to the control memory 14 through the multiplexer 22, wherein the repeated occurrences of B of FIG. 3(f) will be discussed later. The register 16 stores the derived microinstruction in response to the leading edge of a clock (FIG. 3 (a)) applied over a line 40 from the controller 28. The register 16 transfers the derived microinstruction back to the address generator 18 by way of the line 47. At the same time, the register 16 applies the information whether or not the unit U1 uses the bus 12 at the next microinstruction cycle. As previously referred to, the register 16 applies a low level to the controller 28 if the unit U1 does not use the bus 12 at the next microinstruction cycle. Otherwise, the register 16 applies a high level to the controller 28. Each of FIGS. 3(h) and 3(k) shows the microinstructions A', B', C', D', . . . (which correspond to the address signal A, B, C, D, . . . , respectively) temporarily stored in the register 16. The content of the address generator 18 is fed to the address register 20 through the multiplexer 22 so as to continuously update the content thereof, wherein it should be noted that the register 20 does not supply the content thereof to the control memory 14 while the multiplexer 22 selects the generator 18. Since each of the microinstructions includes the address information of the next microinstruction to be derived, the register 16 is sequentially supplied with the microinstructions forming the selected routine. The above-mentioned cycle for deriving each microinstruction continues until the selected microinstruction routine is read out from the control memory 14. During the above-mentioned cycle, the decoder 38 decodes each microinstruction from the register 16. The decoded instruction is fed to the multiplexer 34 which allows the register 32 or the register file 30 to selectively supply the ALU 36 with the contents thereof. The ALU 36 is therefore supplied with both contents and, with microprogrammed control, performs proper arithmetic and/or logic operations, the results of which (e.g., the kind of instruction, an operand length, the operand address, etc.) are stored in the register file 30.

When the unit U1 completes the instruction processing, the command generator 26 applies a control signal to the command decoder 72 of the execution unit U2. Thereafter or prior to the generation of the control signal from the command generator 26, the unit U1 fetches the following instruction to the instruction register 32 from the main memory.

The instruction register 70 of the unit U2 stores the same instruction that the register 32 stores in response to a control signal applied from the unit 1, although the control line is not shown. The content of the register 70 is transferred to the control memory address register 54, which determines or interprets the kind of instruction and thence generates address signals for deriving a microinstruction routine (which corresponds to the kind of instruction) previously stored in the control memory 50. The operation of the loop consisting of the register 54, the control memory 50 and the microinstruction register 52 is the same as in the counterparts of the unit U1, so that further description will be omitted for clarity, wherein, however, the loop operation is initiated in response to the control signal applied from the command decoder 72. During the above-mentioned loop operation, the decoder 67 decodes each microinstruction from the register 52. The decoded instruction is fed to the ALU 66 which performs the appropriate arithmetic and/or logic operations with the contents of the registers 62 and 64. The register 62 stores, for example, the data fetched from the main memory according to an operand address which has been interpreted and stored in the register file 30. The result(s) of the instruction execution in the ALU 66 is transferred to the register file 58. It will be understood that although only a single instruction executing arrangement, viz., the ALU 66, the registers 62 and 64, the register file 58, and the bus driver 68, is shown, there are in practice further provided a plurality of similar execution means.

As previously referred to in the prior art discussion, during the concurrent, synchronous operations of the units U1 and U2, various information paths are formed depending on control signals (not shown) specified by the microinstructions. For example, the contents of the register file 58 are transferred to the register 64, or applied to the bus 12 via the bus driver 68. Further, the information on the bus 12 is applied to the register 62 or the main memory. Furthermore, the unit U2 receives at the register file 30 instructions and/or data from the main memory via the bus 12. It is therefore necessary to prohibit the concurrent use of the bus 12 by the units U1 and U2.

For the sake of simplicity, consider the case where the register file 58 transfers the content thereof to the register 62 through the bus 12, in the case of which the unit U1 is required not to use the bus 12 at the same microinstruction cycle. One known practice, to this end, is to provide an additional bus and multiplexers as mentioned in the opening paragraphs of this specification. In the event that the units U1 and U2 use the bus 12 at the same time, the multiplexer is controlled to connect the register file 58 to the additional bus in order to transfer data between the register file 58 and the register 62 and, hence, the concurrent use of the same bus is avoided. The provision of the multiplexer in question however increases the number of parts with the attendant disadvantage of hardware complexity, which should be avoided especially where available space for parts is limited. The present invention enables the proper use of the bus without the need for the additional bus and multiplexer referred to above. In FIG. 3 (m), microinstruction cycles are shown by reference numerals 1 through 8 for the convenience of description.

In accordance with the present invention, the command generator 56 receives each of the microinstructions applied from the register 52 over a line 42, and generates a pause command (PC) over a line 41, in case the next microinstruction instructs the information transfer from the register file 58 to the register 62 via the bus 12. The pause command (PC) is shown in the cycle 3 of FIG. 3(b), while the above-mentioned next instruction is denoted Q in the cycle 4 of FIG. 3(c). The pause command is fed to the command decoder 24 (U1) which supplies the controller 28 with a high logic level in response to the pause command applied.

Assuming that when the pause command is applied to the unit 1 from the unit 2 in the cycle 3, the microinstruction in the register 16 indicates that the unit U1 uses the bus 12 in the next microinstruction cycle 4 wherein the microinstruction C' will be processed. In this case, the controller 28 outputs a low logic level allowing the multiplexer 22 to couple the address register 20 with the control memory 14. Consequently, the address signal B (the first occurrence in FIG. 3(g)) is again applied to the control memory 14 over the lines 46 and 45, so that the microinstruction B' is twice stored in the register 16 (FIG. 3(h)). On the other hand, the controller 28 outputs a high logic level over the line 43 during the microinstruction cycle 3 (FIG. 3(d)) and hence disables the operation of the ALU 36 during this cycle. This means that the first microinstruction B' (FIG. 3(h)) of the twice occurrences is not used and the second microinstruction B' is implemented in the processing portion (which includes the register file 30, the ALU 36 and register 32 as previously mentioned) of unit U1. Upon the termination of the pause command (PC), the multiplexer 22 again permits the connection between the address generator 18 and the control memory 14, so that the microinstruction C' is stored and thence implemented in the microinstruction cycle 5 which is later by one cycle relative to the cycle 4 during which the unit U2 uses the buse 12. Thus, the concurrent use of thd bus 12 is avoided.

On the other hand, assuming that when the pause command is applied to the unit 1 from the unit 2 in the cycle 3, the microinstruction in the register 16 indicates that the unit U1 does not use the bus 12 in the next microinstruction cycle 4. In this instance, the controller 28 outputs a high logic level so that the multiplexer 22 continues to couple the address generator 18 with the control memory 14. As a consequence, the address signal C is applied to the control memory 14 over the lines 45 (FIG. 3(j)), so that the microinstruction C' is stored in the register 16 in the cycle 4 (FIG. 3(k)). In this case, the unit U1 does not use the bus 12 in the cycle 4 and hence causes no concurrent use of the bus 12. Further, in this case, the control signal applied over the line 43 is shown in FIG. 3(i).

In the foregoing, one instruction processing unit and one execution unit are separately provided and coupled via the bus. However, the present invention is applicable to the case where a plurality of instruction units and a plurality of execution units are arranged. In this instance, the data processing system is usually designed such that two or more execution units do not use a common bus at same microinstruction cycle. It is therefore apparent that the present invention can readily be applied to such extended system, wherein the pause command should be fed to all the instruction processing units.

What is claimed is:

1. A data processing system having no bus utilization priority control, comprising:

an instruction processing unit operating in accordance with a plurality of first microinstructions prestored therein;

an execution unit which operates in accordance with a plurality of second microinstructions prestored therein and which operates synchronously with said instruction processing unit; and a bus operatively connected with said instruction processing unit and said execution unit;

said execution unit generating a pause command when said execution unit uses said bus during the next microinstruction cycle of said second microinstructions;

said instruction processing unit being supplied with said pause command, and including a circuit which causes double occurrences of one of said first microinstructions in response to said pause command in the event that said instruction processing unit uses said bus during the next microinstruction cycle of said second microinstructions, said instruction processing unit further including an instruction processing portion which is arranged to temporarily disable the first microinstruction of said double occurrences in response to said pause command;

said instruction processing unit comprising:

a first control memory for previously storing said first microinstructions, a first control memory address generator for generating address signals for deriving microinstructions from said first microinstructions within said first control memory, a first address register, a multiplexer for selectively allowing either said first control memory address generator or said first address register to couple with said first control memory, said multiplexer normally coupling said first control memory address generator with said first control memory, said first address register receiving the output of said multiplexer and updating the content thereof, a first microinstruction register for storing each microinstruction derived from said first control memory, said first microinstruction register communicating the content thereof back to said first control memory address generator, and a controller receiving the content of said first microinstruction register, said controller, in response to said pause command, allowing said multiplexer to couple said first address register with said first control memory in order to cause said double occurrences of said first microinstructions and at the same time disabling said insturction processing portion in case said instruction processing unit uses said bus during the next microinstruction cycle of said processing unit.

2. A data processing system as claimed in claim 1, wherein said execution unit comprises:

a second control memory for previously storing said second microinstructions, a second control memory address generator for generating address signals for deriving microinstructions from said second microinstructions within said second control memory, a second microinstruction register for storing each microinstruction derived from said second control memory, said second microinstruction register communicating the content thereof back to said second control memory address generator, a command generator for receiving the content of said second microinstruction register and for generating said pause command when said execution unit uses said bus during the next microinstruction cycle of said execution unit.

* * * * *

UNITED STATES PATENT AND TRADEMARK OFFICE
CERTIFICATE OF CORRECTION

PATENT NO. : 4,631,669

DATED : December 23, 1986

INVENTOR(S) : Akinori HORIKAWA

It is certified that error appears in the above-identified patent and that said Letters Patent is hereby corrected as shown below:

Column 1, line 37  Delete "utiization" and insert --utilization--.

Column 2, line 21  "therein:" should read -- therein; --.

Signed and Sealed this

First Day of September, 1987

Attest:

DONALD J. QUIGG

Attesting Officer

Commissioner of Patents and Trademarks